(12) United States Patent
Neville

(10) Patent No.: US 7,665,597 B2
(45) Date of Patent: Feb. 23, 2010

(54) NON-CONTACT ARTICLE ROTATING APPARATUS

(75) Inventor: Brian E. Neville, Edwardsville, IL (US)

(73) Assignee: FKI Logistex, Inc., Mason, OH (US)

( * ) Notice: Subject to any disclaimer, the term of this patent is extended or adjusted under 35 U.S.C. 154(b) by 595 days.

(21) Appl. No.: 10/578,563

(22) PCT Filed: Nov. 10, 2004

(86) PCT No.: PCT/US2004/038249

§ 371 (c)(1),
(2), (4) Date: May 8, 2006

(87) PCT Pub. No.: WO2005/047141

PCT Pub. Date: May 26, 2005

(65) Prior Publication Data

US 2007/0074954 A1   Apr. 5, 2007

Related U.S. Application Data

(60) Provisional application No. 60/518,970, filed on Nov. 10, 2003.

(51) Int. Cl.
*B65G 47/24* (2006.01)
(52) U.S. Cl. .................... 198/415; 198/411; 198/461.1
(58) Field of Classification Search ................ 198/410, 198/411, 415, 461.1
See application file for complete search history.

(56) References Cited

U.S. PATENT DOCUMENTS

| | | | | |
|---|---|---|---|---|
| 3,580,379 A | * | 5/1971 | Shuster et al. | 198/401 |
| 3,677,389 A | * | 7/1972 | Benatar et al. | 198/377.02 |
| 3,973,672 A | * | 8/1976 | Frost | 198/412 |
| 5,211,281 A | * | 5/1993 | Almes | 198/781.09 |
| 6,126,383 A | * | 10/2000 | Franklin et al. | 414/792 |
| 6,164,431 A | * | 12/2000 | Morisod | 198/415 |
| 6,460,683 B1 | * | 10/2002 | Pfeiffer | 198/460.1 |
| 6,591,966 B1 | * | 7/2003 | Lee et al. | 198/415 |
| 6,622,846 B1 | * | 9/2003 | Dean | 198/370.09 |
| 6,659,264 B2 | * | 12/2003 | Pelka | 198/456 |

(Continued)

FOREIGN PATENT DOCUMENTS

DE       4205310       8/1993

(Continued)

*Primary Examiner*—Douglas A Hess
(74) *Attorney, Agent, or Firm*—Frost Brown Todd LLC

(57) ABSTRACT

An non-contact article rotating device is disclosed that rotates articles without impacting or contacting the article other than the bottom of the article. The device is designed to accept a stream of articles with minimum gaps between them, and rotate only those that are programmed to be rotated. The device accepts any combination of rotated and non-rotated articles and can rotate them through angles up to and through 360 degrees. One embodiment of the disclosed device uses only one single-speed drive motor and pneumatic components to operate two conveyor roller sections. While one conveyor roller section maintains a constant speed, the conveyor rollers of the second conveyor roller section are sequentially braked and unbraked to rotate an article that is positioned partially on the first conveyor roller section and partially on the second conveyor roller section. The difference in speeds between the two conveyor sections rotates the article.

28 Claims, 4 Drawing Sheets

U.S. PATENT DOCUMENTS

| | | | |
|---|---|---|---|
| 6,899,219 B2 * | 5/2005 | Cotter et al. | 198/781.09 |
| 6,981,580 B2 * | 1/2006 | Meyer | 198/415 |
| 7,090,067 B2 * | 8/2006 | Schiesser et al. | 198/395 |
| 7,233,840 B2 * | 6/2007 | Schiesser et al. | 700/230 |
| 7,552,815 B2 * | 6/2009 | Pahud | 198/413 |

FOREIGN PATENT DOCUMENTS

| | | |
|---|---|---|
| DE | 10049077 | 4/2002 |
| EP | 0881173 | 12/1998 |
| FR | 2537104 | 6/1984 |
| JP | 61064621 | 4/1986 |
| US | 4273239 | 6/1981 |
| WO | WO 00/76887 | 12/2000 |

* cited by examiner

NON-CONTACT ARTICLE ROTATING APPARATUS

CROSS REFERENCE TO RELATED APPLICATIONS

This application claims the benefit of U.S. provisional application Ser. No. 60/518,970 filed Nov. 10, 2003 and PCT International Application serial number PCT/US04/038249 having an international filing date of Nov. 10, 2004 (published May 26, 2005 as International Publication Number WO 2005/047141 A2), the entire disclosures which are incorporated herein by reference.

STATEMENT REGARDING FEDERALLY SPONSORED RESEARCH

Not applicable.

BACKGROUND TO THE INVENTION

1. Technical Field

The invention relates to an article rotating assembly for rotating conveyed articles. More particularly, the invention relates to an apparatus and method for the in-line rotating of selected articles without contacting or bumping the articles.

2. Background Art

Article turner assemblies are well known for rotating conveyed articles, i.e., for rotating the articles a designated amount, usually 90°, as they are conveyed along a path. Article turner assemblies have many applications in a variety of article handling applications. For instance, an article turner assembly often is used as part of a pattern former of a palletizer.

Known article rotating devices have operating and structural characteristics which make them undesirable for use with many products and packages. Present day high speed conveying operations make any slow down in movement along the line or any shut-down of the line caused by package or product deterioration unacceptable.

Some article turner assemblies require contact between the operative element of the article turner assembly and a front and/or side surface of the article to turn the article. Article turner assemblies of this type are called "bump" or "turnpost" turners. In this type of article turner assembly, the article is conveyed so that the front surface of the article contacts a vertically-extending stationary turnpost and spins about the turnpost to effect the desired 90° of article rotation. The article impacts the turnpost with substantial force when the article is conveyed at high speeds. In the usual case in which the article comprises a package containing goods, this impact may result in substantial abrasion or other marring of the package and may damage goods contained in the package.

U.S. Pat. No. 6,126,383 uses a diverting mechanism which shoves turned cases to the side at a very high rate of speed. This diverter causes impact and friction to the sides of each turned article, while requiring the bottom of the article to slide across the infeed conveyor. Damage to the contents of the package (e.g., loose glass bottles in a case) is possible, while some soft-sided loose packages (e.g. bundles of paper towels, or stacks of newspapers) may be damaged on the sides or bottoms. Loosely packaged articles may shingle and not shift over at the bottom, causing a faulty turn or no turn at all. This device also relies on guides at the discharge end of the rotating mechanism for squaring centering turned articles, which is another point of potential impact, frictional product damage, or product jams.

Many turners require a significant number of precise adjustments when changing over from one article size to another. Adjustment in conveyor angle, diverter position, horizontal and vertical conveyor position, and speed differential must all be made when products change. Since most users run a variety of different products (sometimes hourly changes) this tedious adjustment and fine-tuning process is not desirable. While settings can be written down and repeated to some extent each time a product is to be run, it is a very difficult trial and error process to initially get the settings correct. Automatic linear actuation devices can be utilized to reduce the manual input into article changeover, but this adds significant cost and complexity to the device.

Brewpack Ltd. of Surrey, England makes a twin mattop belt inline turner which utilizes two side-by-side modular plastic conveyor belts, commonly referred to as mattop belts. The device typically consists of a wide belt with a low friction material, and a higher friction narrow belt that runs parallel to the wide belt. Both belts run at constant, but different speeds, so that when an article is in contact with both belts, the article tends to rotate (however, not about its center of gravity or geometrical center.) Articles are fed onto the turner largely in contact with the wide low friction belt. The narrow high friction belt stays slightly below the level of the wide belt, if the article is to remain unturned. If the article is to be turned, then one or more actuators raise one or more sections of the narrow belt to provide the speed differential required for article rotation. Since most of the article must rest on the wide belt so it is transported in a stable manner when not turned, only one edge is in contact with the narrow high friction belt when the article is to be turned. This style of turner basically references both turned and non-turned articles to one side of the device (the side with the narrow belt.)

A large gap is required between turned/non-turned articles since the sections of narrow belt that raise and lower are relatively long (a turned article cannot be in this section at the same time a non-turned article is.) Articles do not turn about their geometrical centers or their centers of gravity. Articles are referenced to one side of the device upon their exit. This can have a negative impact on the operation of downstream equipment such as slat dividers or pattern forming conveyors. It is desirable to have product exit the turner on the centerline in many applications.

There are several designs for devices that employ the "lift and turn" method of selectively rotating articles. However this is a very slow process, and is not suitable for high-speed inline applications.

U.S. Pat. No. 3,580,379 describes an inline article rotating device that utilizes a "slat divider" method for rotating packages. This type of device is very difficult to accurately control and fine tune. Different article sizes may require different size platens and lane locations that make this an impractical device for use with multiple products.

There are several designs for article turners that consist of multiple parallel conveyors with fixed speed differentials where all articles that pass through the device are rotated.

BRIEF SUMMARY OF THE INVENTION

The present invention comprises an non-contact article rotating apparatus and process that selectively rotates articles without impact or contact with their fronts or sides. These and other objects and advantages of the invention will be apparent hereinafter.

BRIEF DESCRIPTION OF THE SEVERAL VIEWS OF THE DRAWINGS

In the drawings wherein the numerals and letters refer to like parts wherever they occur.

Corresponding reference numerals indicate corresponding parts throughout the several views of the drawings.

While one embodiment of the present invention is illustrated in the above referenced drawings and in the following description, it is understood that the embodiment shown is merely for purpose of illustration and that various changes in construction may be resorted to in the course of manufacture in order that the present invention may be utilized to the best advantage according to circumstances which may arise, without in any way departing from the spirit and intention of the present invention, which is to be limited only in accordance with the claims contained herein.

DETAILED DESCRIPTION OF THE INVENTION

Description of General Operation

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the following description or shown in the accompanying drawings shall be interpreted as illustrative and not in a limiting sense.

The non-contact article rotator is a device that selectively rotates articles without impact or contact to their front or sides. The non-contact article rotating apparatus A is designed to accept a stream of articles with a minimum gap between them, and rotate only those that are programmed to be rotated. The device can accept any combination of rotated and non-rotated articles and can rotate them through angles up to and through 360 degrees. The typical application is to rotate selected articles 90 degrees to facilitate the formation of a pallet pattern.

The non-contact article rotating apparatus A does not use expensive and complicated servo drives but instead relies on one single-speed drive and simple pneumatic components that are very easy to troubleshoot, readily available, and inexpensive to maintain or replace. It also can be broken up into independently driven/non-driven sections of as little as one roller. One embodiment of the non-contact article rotating apparatus A breaks the conveyor up into two-roller sections each having rollers spaced at between about 2.12" and about 2.25" centers. This means that a minimum of about 4.5" gap is necessary between rotated/non-rotated articles. Closer spacing of actuators results in a higher degree of rotating accuracy and faster throughput. Additionally, the control system is simple for the end user to operate, troubleshoot and maintain.

Figure 1:
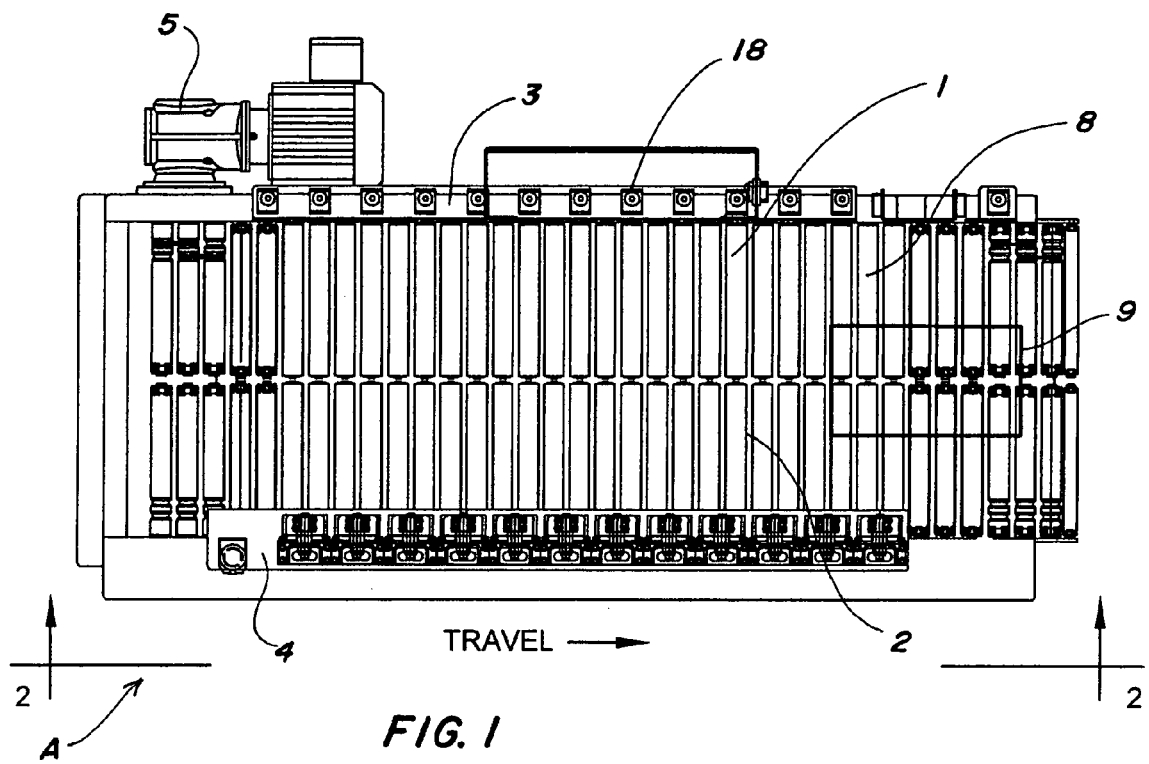
FIG. 1 is a view showing the top of one embodiment of the present invention.
Figure 2:
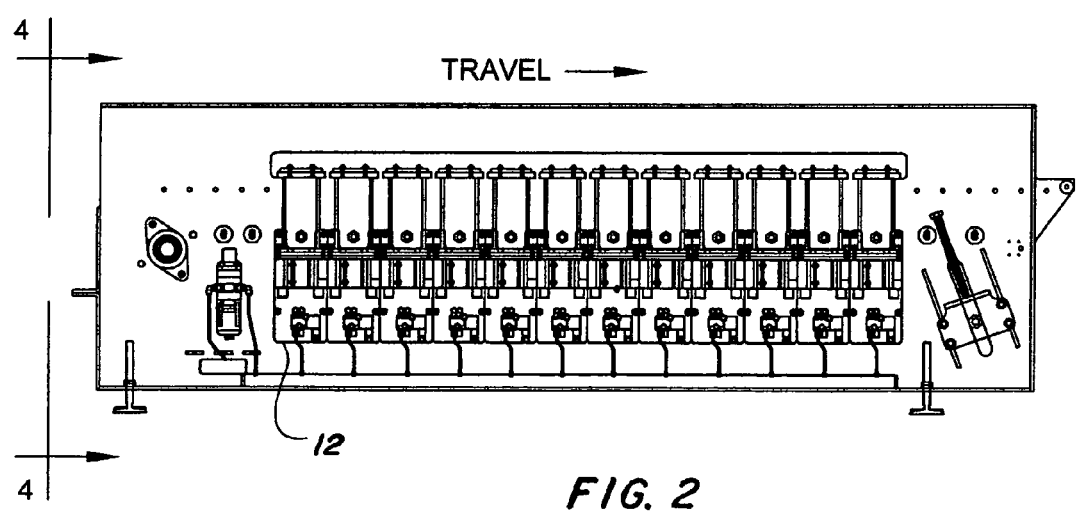
FIG. 2 is a right side view of one embodiment of the present invention.
Figure 3:
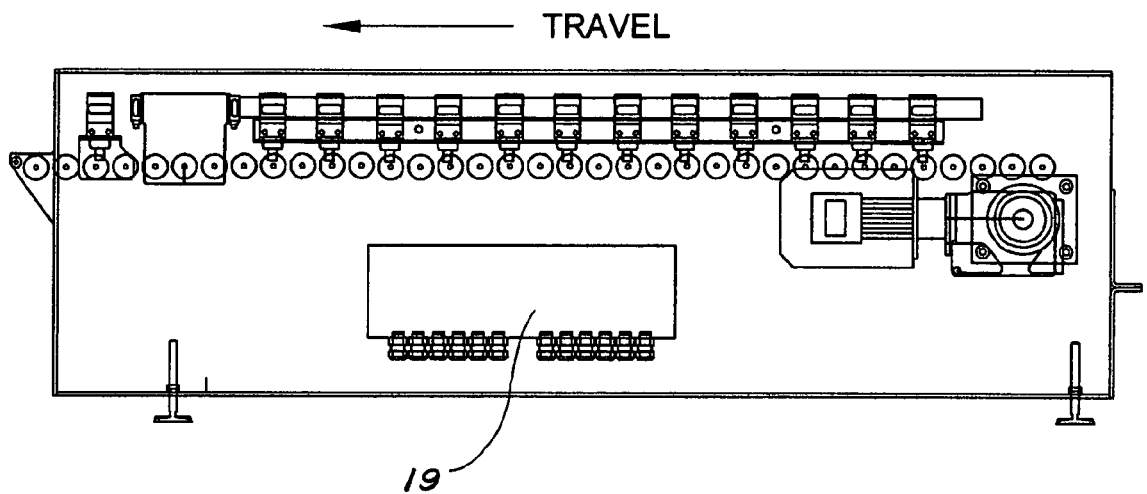
FIG. 3 is a left side view of one embodiment of the present invention.
Figure 4:
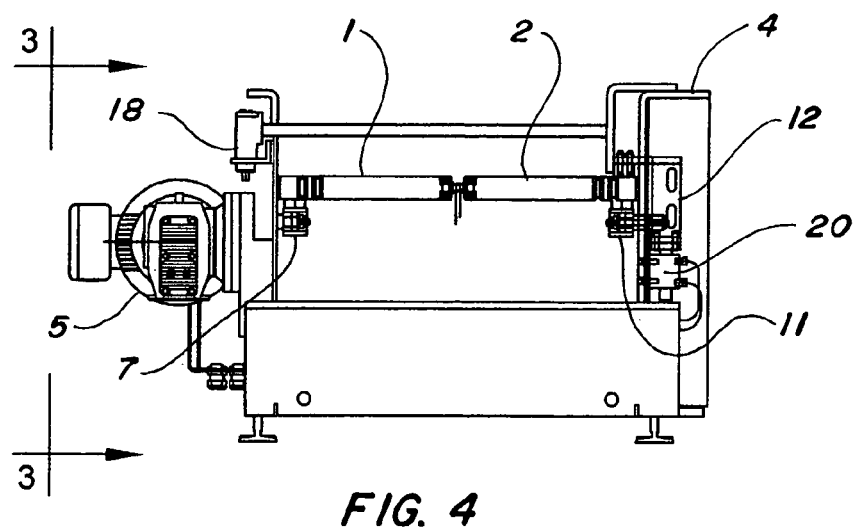
FIG. 4 is a fragmentary end view of the end of one embodiment of the present invention.

Description of the Device:

Referring now to FIG. 1, FIG. 2, and FIG. 3, one embodiment of a non-contact article rotating apparatus A is shown. The non-contact article rotating apparatus A comprises a first parallel live roller conveyor 1, a second parallel live roller conveyor 2, a first support rail 3, and a second support rail 4. Each of the first and second parallel live roller conveyors 1 and 2 are driven by one motor 5 with the motor operatively connected to the first parallel live roller conveyor 1 and the second parallel live roller conveyor 2 by two drive belts 6 (FIG. 4)—one for each of the first parallel live roller conveyer 1 (FIG. 1) and the second parallel live roller conveyor 2. It is understood that the two drive belts 6 operate at the same speed as determined by the speed of the motor 5. A series of snub rollers 7 and 11 urge the drive belts 6 against the bottom of a plurality of conveyor rollers 8 to thereby transfer an article 9 along the top surface of the plurality of conveyor rollers 8.

In the following description of one embodiment of the present invention, the embodiment uses a parallel system of two live roller conveyors. It is understood that other types of conveyors other than live roller conveyors may also be used and still remain within the scope of the present invention. For example, individual or incremental continuous belts or cleats or bars, or virtually any other type of conveyor may also be used as long as the variation in speed between the two parallel conveyors is capable of rotating an article on the conveyor without otherwise touching the article.

Figure 5:
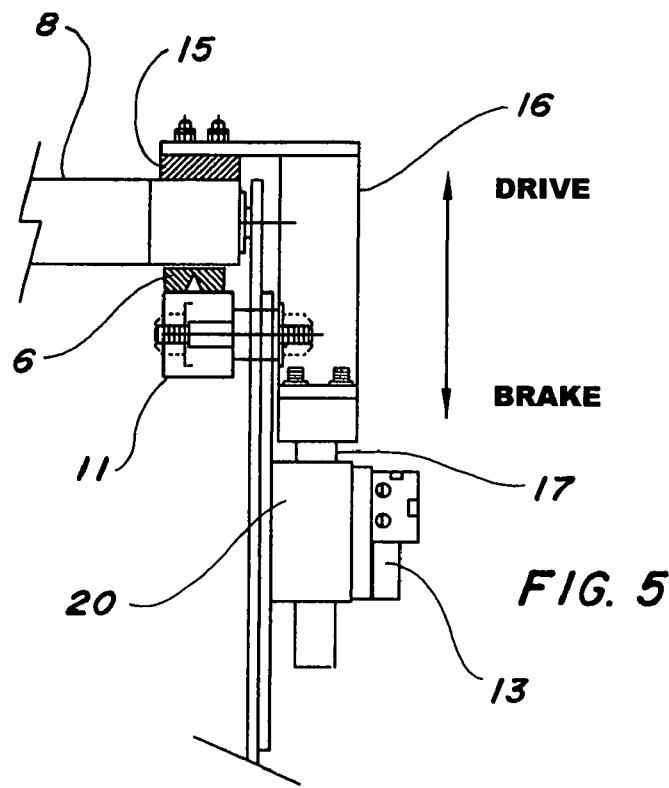
FIG. 5 is a partial section view of one embodiment of the invention.

The first support rail 3 comprises a first series of snub rollers 7 that continuously urge one drive belt 6 into contact with the bottom of the plurality of rollers 8 in the first parallel live roller conveyor 1. The second support rail 4 includes a second set of snub rollers 11 (FIG. 4 and FIG. 5) that urge the second drive belt 6 into contact with the bottom of the plurality of conveyor rollers 8 on the second parallel live roller conveyor 2, however, the second set of snub rollers 11 are controlled by a plurality of clutch/brake assemblies 12. Each of the plurality of clutch/brake assemblies 12 comprise a solenoid valve 13, a guided pneumatic cylinder 20, a brake pad 15, and a sensor 18 to detect the article 9. Each of the clutch/brake assemblies 12 is operatively connected to at least one of the second series of snub rollers 11 and the at least one snub roller and at least one brake pad 15 is attached to a connector assembly 16, and the connector assembly 16 is attached to a cylinder rod 17 of the guided pneumatic cylinder 20. The guided pneumatic cylinder 20 is normally extended, with the snub roller 7 pushing against the drive belt 6 to provide drive to the conveyor rollers 8.

In operation, the first parallel live roller conveyor 11 (FIG. 1, FIG. 2 and FIG. 3) and the second parallel live roller conveyor 2 are driven at the same speed, as both the first and second series of snub rollers 7 and 11 are continuously urging the two drive belts 6 against the bottom of all the rollers 8. In this mode of operation, the articles 9 are not rotated and are simply conveyed through the non-contact article rotating apparatus A in the same orientation as they entered the non-contact article rotating apparatus A.

The article 9 rotating process includes stopping the rotation of the conveyor rollers 8 of the second parallel live roller conveyor 2 by activating the solenoid valve 13 (FIG. 5) to move the cylinder rod 17 downward. As the cylinder rod 17 moves downward the connector 16 attached to the cylinder rod 17 also moves downward to pull the second series of snub rollers 11 away from the drive belt 6 while simultaneously applying the brake pad 15 to the conveyor roller 8. This operation stops the conveyor roller 8 that is under the article 9. When the conveyor rollers 8 on the second parallel live roller conveyor 2 are stopped and the conveyor rollers 8 on first parallel live roller conveyor 1 continue to rotate, the article 9 tends to rotate about its geometrical center (as long as weight is evenly distributed across the bottom of the article.) If articles 9 enter the device on the centerline, both rotated and non-rotated articles tend to be centered upon the non-contact article rotating apparatus A upon their exit. When the article 9 has passed by the stopped conveyor rollers 8 that are associated with the clutch/brake assembly 12, the solenoid valve 13 de-energizes allowing the connector 16 to move upward thereby releasing the pressure applied by the brake pad 15 to the conveyor roller 8 while at the same time urging the snub roller 11 to again urge the drive belt 6 against the bottom of the conveyor roller 8 to restore drive rotation to the conveyor rollers 8.

It is appreciated that while the current embodiment includes a live roller conveyor driven by a v-belt drive that is braked by clutch assemblies, other types of conveyors and drive systems may also be used as long as the conveying system selected is capable of being stopped in response to signals sent to the drive system. For example, two parallel belt conveyors may utilize a drive system that stops quickly when the power to the drive system is interrupted.

Based upon the conveyor speed and properties of the articles 9 to be rotated, the amount of time the article 9 takes to rotate through the desired angle is calculated. When the article 9 has traveled sufficiently far so as to be located entirely upon conveyor rollers 8 that are capable of being braked, all applicable clutch/brake assemblies 12 will actuate at the same time. As the article 9 begins to rotate and move forward, the clutch/brake assemblies 12 are sequentially actuated as their respective sensors 18 are triggered until the allotted rotating time has expired. As the sensors 18 detect that the article 9 has moved off a section of stopped conveyor rollers 8, the clutch/brake assembly 12 will disengage and the snub roller 11 will be pushed up into the drive belt 6 to provide drive to the conveyor rollers 8 again. After the article 9 has rotated through the desired angle; that is, when the rotating time has expired, all clutch/brake assemblies 12 that are still engaged will disengage at the same time and drive will be restored to all conveyor rollers 8 under the article to halt rotation.

Figure 6:
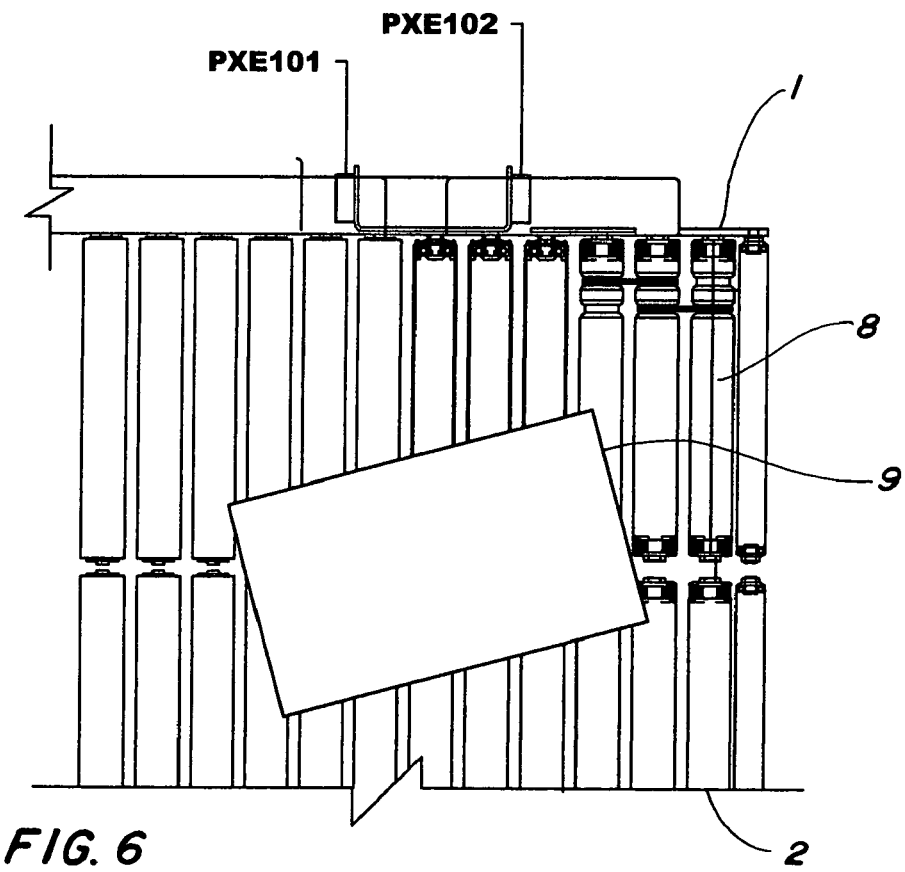
FIG. 6 is a partial top view of one embodiment of the invention showing an article as it moves on the invention.
Figure 7:
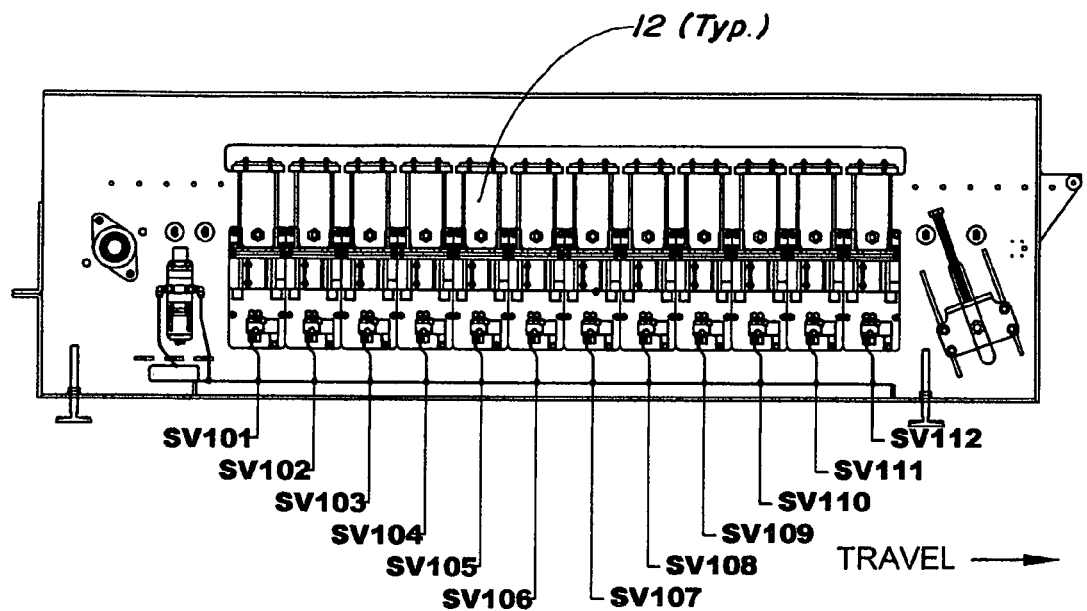
FIG. 7 is a right side view of one embodiment of the invention showing the arrangement of the clutch/brake assemblies.

In the present embodiment, PE101 and SV101 (FIG. 7 and FIG. 8) operate the first clutch/brake assembly. PE102 and SV102 operate the second clutch/brake assembly, and so on through PE112 and SV112. PXE101 and PXE102 (FIG. 6) are utilized for the optional auto-correct feature.

In an alternative embodiment of the present invention, an auto-correct option gives the non-contact article rotating apparatus A the ability to detect whether or not an article 9 (FIG. 6) has rotated properly as it exits the device. Utilizing this feedback, the non-contact article rotating apparatus A can then automatically adjust its control outputs (rotating time) to effect the desired angle of rotation on future rotated articles 9. The auto-correct feature uses two distance detecting sensors PXE101 and PXE102. As the rotated article 9 passes PXE102, a momentary "snapshot" is taken with the distance detecting sensors PXE101 and PXE102 to determine distances "A" and "B." Because the sensors PXE101 and PXE102 are a known distance apart, and the distances "A" and "B" have been determined, the relative angle of the article 9 in relation to the travel of the article through the non-contact article rotating apparatus A can be calculated. Deviations from the desired angle can be sensed and automatically corrected on future turned articles 9. It is understood that other means may also be used to detect the orientation of the article 9 on the non-contact article rotating apparatus A. For example, in an alternate embodiment, only one detector is used to take two measurements of the location of the article 9, with the two measurements being taken at a certain short interval of time. Using the speed of the conveyor and these two measurements, the angular position of the article 9 in relation to the line of travel of the non-contact article rotating apparatus A can be calculated using trigonometric math.

In yet another alternative embodiment of the present invention, a method for determining the relative angle of an article includes mounting two sensors above or below the non-contact article rotating apparatus A. As articles 9 pass below or above the sensors, the time at which they are detected will be different if they are not turned in increments of 90 degrees. Knowing the speed of the conveyor, which sensor was activated first, and the time deviation between the two, the relative angle of the article 9 on the non-contact article rotating apparatus A is calculated and the angle is corrected by manipulation of the plurality of clutch/brake assemblies 12. Yet another method for auto-correction includes utilizing an overhead machine vision system or camera to detect the placement and orientation of an article 9 on the non-contact article rotating apparatus A. Based upon these parameters as determined by the machine vision system, the rotating time is adjustable by again manipulating the activation and deactivation of the clutch/brake assemblies 12.

In another embodiment, the non-contact article rotating apparatus A may be operated in manual control. When the non-contact article rotating apparatus A is in manual control, the operator can adjust a rotating timer (not shown) at a main operator control station or a non-contact article rotator control station 19 by pressing an INCREASE TURN button, to increase the article rotating time, or a DECREASE TURN button, to decrease the article rotating time. In an alternative variation, the non-contact article rotating apparatus A is equipped to rotate articles through angles greater than 90 degrees, in which case the desired angle to be changed is selected via a push button or selector switch prior to manual adjustment. In either embodiment, when either the INCREASE TURN or the DECREASE TURN button is pushed, the amount of rotating time will be incremented or decremented by about 1 millisecond for each push of the button. Additionally, in these alternative embodiments, the rotating timer will increase or decrease at an accelerated rate when the buttons are held down for continuous activation of either the INCREASE TURN or DECREASE TURN push button.

Figure 8:
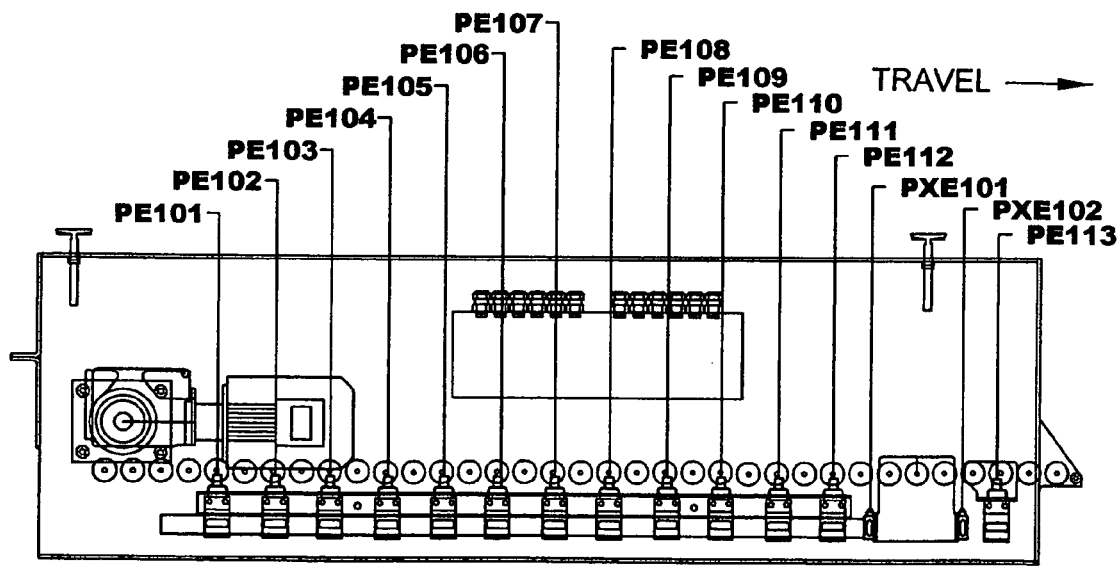
FIG. 8 is a left side view of one embodiment of the invention showing the arrangement of certain sensor assemblies.

Programming for Automatic Control:

Where an embodiment of the present invention includes the auto-correct mode, the following method of achieving auto-correction is incorporated. In the auto-correct mode, the sensors for the auto-correct function are located at the discharge end of the non-contact article rotating apparatus A. As seen in FIG. 8, the distance detecting sensors PXE101 and PXE102 is 7.5", the location detecting sensor PE113 is located 2.75" downstream of PXE102. When the rotated article 9 is detected by sensor PE113, the distance to the article 9 should be recorded as dimension "A" (inches) and dimension "B" (inches). When the desired angle of rotation is 90 degrees, "A" and "B" should be equal. If the article 9 is under-rotated, then "A">"B", and if the article 9 is over-rotated "A"<"B". It is appreciated that only turned articles 9 should be measured by the auto-correct sensors. If the measured article 9 is detected as not being rotated enough, then time will be added to the rotate time. If it is determined that the article 9 is rotated too much, time will be subtracted from the rotate time. If the angle is sufficiently incorrect as to cause downstream problems; i.e., a jammed conveyor, then preventive measures can be taken such as, for example, shutting down the machine.

The present invention provides a non-contact article rotating apparatus A that works as a non-contact device that requires no shifting of either rotated or straight article 9. There is no contact to the sides of articles 9 required while passing through the non-contact article rotating apparatus A. While in other embodiments of the present invention it is possible to utilize guides at the discharge end of the non-contact article rotating apparatus A to ensure that exiting articles 9 are squared, such guides are not generally necessary. The only guiding that may be necessary is on the conveyor feeding the non-contact article rotating apparatus A to ensure the articles 9 enter on the centerline of the rotating device, and even this can be avoided with the use of a centering type conveyor such as a herringbone design.

The present non-contact article rotating apparatus A requires no manual adjustment when changing from one product to another, since all adjustable settings are saved within the program. Guides on the conveyer feeding the non-contact article rotating apparatus A are the only adjustment required in order to center the article 9 on the apparatus A. Initial set-up and fine tuning of each article 9 is simplified by allowing the user to push one of two buttons to either increase of decrease the turn. Also, fine tuning is made automatically when the auto-correction function is incorporated into the embodiment of the non-contact article rotating apparatus A selected by the user.

It is understood that the above embodiments include devices that contain control logic to setup and operate the non-contact article rotating apparatus A. Depending upon the specific application, the control logic characteristics may be modified as required within the control logic of the non-contact article rotating apparatus A as required by the components selected and the specific application of the invention.

It is understood that while the above embodiment discloses a configuration where the first conveyor operates at a constant speed while the second conveyor's speed is varied to rotate the article 9, other embodiments of the invention include adding the ability to vary the speeds of both the first conveyor and the second conveyor. In yet other embodiments, the direction of one or both of the first and second conveyors may be reversed to accomplish rotation of the article 9. For example, in an embodiment incorporating a live roller conveyor, each live roller may be equipped with an independent and/or reversible drive system. By selectively and/or sequentially varying the speed of each individual live roller, or by selectively and/or sequentially reversing the direction of each live roller rotation, the article 9 on the non-contact article rotating device A is rotated as needed for a specific application.

While the above description describes various embodiments of the present invention, it will be clear that the present invention may be otherwise easily adapted to fit any configuration where a non-contact article rotating device is required. As various changes could be made in the above constructions without departing from the scope of the invention, it is intended that all matter contained in the above description or shown in the accompanying drawings shall be interpreted as illustrative and not in a limiting sense.

The invention claimed is:

1. A non-contact article rotating apparatus comprising:

a first conveyor having a first plurality of generally constant diameter cylindrical individual rotating transporting components;

a second conveyor having a second plurality of generally constant diameter cylindrical individual rotating transporting components, wherein an article moving on an article rotating apparatus is rotated around the article's generally vertical axis by at least one of either stopping, reversing, or selectively varying a speed of at least one individual rotating transporting component within one of either the first plurality of individual rotating transporting components or the second plurality of rotating transporting components, wherein the least one individual rotating transporting component within one of either the first plurality of individual rotating transporting components or the second plurality of rotating transporting components is at least one of either stopped, reversed, or selectively varied in speed for a specific rotating period of time as determined by a value stored in a rotating timer, wherein the specific rotating period of time may be adjusted to control the amount of angular rotation that the article is rotated about the article's generally vertical axis, wherein each of the individual rotating transporting components of the first plurality of individual rotating transporting components and the second plurality of rotating transporting components include live rollers, wherein the first conveyor is a first live roller conveyor containing a first plurality of live rollers and the second conveyor is a second live roller conveyor containing a second plurality of live rollers, wherein the first plurality of live rollers of the first live roller conveyor are driven by a first drive belt, and wherein the second plurality of live rollers of the second live roller conveyor are driven by a second drive belt;

at least one sensor that detects a position of the article on the non-contact article rotating apparatus wherein the position of the article is used to at least one of either activate or deactivate the rotating timer;

a motor operatively connected to the first live roller conveyor through the first drive belt and wherein the motor is operatively connected to the second live roller conveyor by the second drive belt;

a first plurality of snub rollers that urge the first drive belt against the first plurality of live rollers of the first live roller conveyor and a second plurality of snub rollers that urge the second drive belt against the second plurality of live rollers of the second live roller conveyor, wherein the second plurality of snub rollers are controlled by a plurality of clutch/brake assemblies, wherein each of the plurality of clutch/brake assemblies comprises a solenoid valve, a guided pneumatic cylinder, a brake pad, and a clutch/brake sensor, wherein each of the clutch/brake assemblies is operatively connected to at least one of the second plurality of snub rollers, and the at least one of the second plurality of snub rollers and at least one brake pad are attached to a connector assembly attached to a cylinder rod of the guided pneumatic cylinder, wherein the guided pneumatic cylinder is normally extended, with the at least one of the second plurality of snub rollers pushing against the second drive belt to drive at least one of the conveyor rollers of the second live roller conveyor, wherein the clutch/brake sensor of at least one of the plurality of clutch/brake assemblies detects the article selected to be rotated as it travels upon the non-contact article rotating apparatus, and wherein upon such detection, the sensor provides a signal to a control device that activates the solenoid valve of the related clutch/brake assembly to move the connector for that related clutch/brake assembly such that the brake pad mounted onto the connector contacts at least one of the live rollers of the second live roller conveyor and at least one snub roller of the second plurality of snub rollers is urged away from the second drive belt to thereby stop the at least one live roller of the second live roller conveyor from rotating.

2. The non-contact article rotating apparatus of claim 1 wherein the control device variably adjusts the period in which each of the plurality of clutch/brake assemblies is activated and deactivated.

3. The non-contact article rotating apparatus of claim 2 wherein the period in which each of the individual clutch/brake assemblies is activated or deactivated is related to an amount the article on the non-contact article rotating apparatus is rotated about its generally vertical axis.

4. The non-contact article rotating apparatus of claim 3 wherein activation of the solenoid valve of the clutch/brake assembly causes the cylinder rod to move which in turn moves at least one of the second series of snub rollers away from at least one live roller of the second live roller conveyor, while simultaneously applying the brake pad to at least one of the live rollers of the second live roller conveyor to stop the live roller from rotating.

5. The non-contact article rotating apparatus of claim 4 wherein the solenoid valve for one of the plurality of clutch/brake assemblies is deactivated when the clutch/brake detector senses the article has passed by at least one of the second plurality of live rollers of the second live roller conveyor that has been stopped from rotating, thereby allowing the connector to move upward to release the pressure applied by the brake pad to the live roller that was stopped from rotating, while the connector at the same time urges at least one snub roller from the second set of snub rollers into contact with the second drive belt such that the second drive belt rotates the at least one live roller of the second live roller conveyor.

6. The non-contact article rotating apparatus of claim 5 wherein the amount of time the article takes to rotate about its generally vertical axis is based upon the conveyor speed of the first live roller conveyor and the second live roller conveyor and at least one of the size of the article, the weight of the article, the shape of the article, and a selected method of packaging the article.

7. The non-contact article rotating apparatus of claim 6 wherein all applicable clutch/brake assemblies will actuate at the same time when the article has traveled sufficiently far on the non-contact article rotating apparatus so as to be located entirely upon at least one of the second plurality of live rollers of the second live roller conveyor that are equipped with clutch/brake assemblies.

8. The non-contact article rotating apparatus of claim 6 wherein, as the article begins to rotate and move forward, the clutch/brake assemblies are selectively actuated as their respective clutch/brake sensors are triggered until an allotted rotating time has expired.

9. The non-contact article rotating apparatus of claim 8 wherein all the clutch/brake assemblies that are still engaged will disengage at the same time to restore drive to all the second plurality of live rollers of the second live roller conveyor under the article to halt rotation of the article when the article has turned through a desired amount of rotation about its generally vertical axis.

10. The non-contact article rotating apparatus of claim 9 further comprising an auto-correction mode that gives the non-contact article rotating apparatus the ability to detect whether or not the article has rotated properly as it exits the non-contact article rotating apparatus and provides an article orientation signal to the control device.

11. The non-contact article rotating apparatus of claim 10 wherein, if the auto-correction mode utilizes the article orientation signal to allow the control device to automatically adjust at least one control output to adjust the rotating time to achieve the desired amount of rotation on later articles that will be traveling through the non-contact article turning apparatus.

12. The non-contact article rotating apparatus of claim 11 wherein the auto-correction mode uses a first distance detecting sensor to detect a first position of the article and then a second position of the article as the article traverses the non-contact article rotating apparatus, and wherein the first and second positions are used to calculate the angle of the article in relation to the travel of the article on the non-contact article rotating apparatus.

13. The non-contact article rotating apparatus of claim 11 wherein the auto-correction mode uses a first distance detecting sensor to detect a distance A between the first distance detecting sensor and the article, and a second distance detecting sensor to detect a distance B between the second distance detecting sensor and the article, both distance A and distance B being detected at generally the same time.

14. The non-contact article rotating apparatus of claim 13 wherein the distance A and the distance B are used to calculate an angle C between the longitudinal axis of an article on the non-contact article rotating apparatus and a longitudinal axis of the non-contact article rotating apparatus.

15. The non-contact article rotating apparatus of claim 14 wherein the angle C is used to adjust the activation time of the clutch/brake assemblies to achieve a desired amount of rotation of the article about its generally vertical axis.

16. The non-contact article rotating apparatus of claim 11 wherein an angle $C_1$ between the longitudinal axis of an article on the non-contact article rotating apparatus and the longitudinal axis of the non-contact article rotating apparatus is determined based upon the orientation of the article traveling on the non-contact article rotating apparatus as detected by two distance sensors that have been mounted above or below the non-contact article rotating apparatus, and wherein the angle $C_1$ is used to adjust the activation time of the clutch/brake assemblies to achieve a desired amount of rotation of the article about its generally vertical axis.

17. The non-contact article rotating apparatus of claim 11 wherein an angle $C_2$ between the longitudinal axis of an article on the non-contact article rotating apparatus and a longitudinal axis of the non-contact article rotating apparatus is determined by utilizing an overhead machine vision system or camera to detect the placement and orientation of the article on the non-contact article rotating apparatus, and wherein the angle $C_2$ is used to adjust the activation time of the clutch/brake assemblies to achieve a desired amount of rotation of the article about its generally vertical axis.

18. The non-contact article rotating apparatus of claim 11 wherein the activation and deactivation time of the plurality of clutch/brake assemblies is determined manually by an operator who can adjust a rotating timer that controls the activation time of the plurality of clutch/brake assemblies.

19. The non-contact article rotating apparatus of claim 18 wherein the operator adjusts the rotating timer by one of either pressing an INCREASE TURN button to increase the article rotating time, or a DECREASE TURN button to decrease the article rotating time, or by positioning a selector switch to either increase or decrease the article rotating time, the article rotating time in each instance being determined by an adjusted value of time within the rotating timer.

20. A non-contact article rotating apparatus comprising:
a first conveyor having a first plurality of generally constant diameter cylindrical individual rotating transporting components;
a second conveyor having a second plurality of generally constant diameter cylindrical individual rotating transporting components
wherein an article moving on a non-contact article rotating apparatus is rotated by at least one of either stopping, reversing, or selectively varying a speed of at least one individual rotating transporting component within one of either the first plurality of individual rotating transporting components or the second plurality of rotating transporting components such that the article is rotated a specific amount around the article's generally vertical axis,
wherein each of the individual rotating transporting components of the first plurality of individual rotating transporting components and the second plurality of rotating transporting components include live rollers,
wherein the first conveyor is a first live roller conveyor containing a first plurality of live rollers and the second conveyor is a second live roller conveyor containing a second plurality of live rollers, and
wherein the live rollers of the first live roller conveyor are driven by a first drive belt and wherein the live rollers of the second live roller conveyor are driven by a second drive belt;
a first plurality of snub rollers that urge the first drive belt against the live rollers of the first live roller conveyor and a second plurality of snub rollers that urge the second drive belt against the live rollers of the second live roller conveyor;
means for at least one of either varying the speed of, reversing, or stopping the rotation of at least one of the live rollers on the second live roller conveyor
wherein the means for at least one of either reversing or stopping the rotation includes a plurality of clutch/brake assemblies that control the second Plurality of snub rollers,
wherein each of the plurality of clutch/brake assemblies comprise a solenoid valve, a guided pneumatic cylinder, a brake pad, and a clutch/brake sensor, and each of the clutch/brake assemblies is operatively connected to at least one of the second plurality of snub rollers, and the at least one of the second plurality of snub rollers and at least one brake pad are attached to a connector assembly attached to a cylinder rod of the guided pneumatic cylinder, and
wherein the guided pneumatic cylinder is normally extended, with the at least one of the second plurality of snub rollers pushes against the second drive belt to drive at least one of the live rollers of the second live roller conveyor.

21. The non-contact article rotating apparatus of claim 20 wherein the clutch/brake sensor of one of the plurality of clutch/brake assemblies detects the article as it travels upon the non-contact article rotating apparatus, wherein upon such detection, the sensor provides a signal to a control device that activates the solenoid valve of the related clutch/brake assembly to move the connector for that related clutch/brake assembly such that the brake pad mounted onto the connector contacts at least one of the live rollers of the second live roller conveyor and at least one snub roller of the second plurality of snub rollers is urged away from the second belt to thereby stop the at least one live roller of the second live roller conveyor from rotating.

22. The non-contact article rotating apparatus of claim 21 wherein activation of the solenoid valve of the clutch/brake assembly causes the cylinder rod to move which in turn moves at least one of the second series of snub rollers away from the second conveyor, while simultaneously applying the brake pad to at least one of the live rollers of the second live roller conveyor to stop the live roller from rotating.

23. The non-contact article rotating apparatus of claim 21 wherein the solenoid valve for one of the plurality of clutch/brake assemblies is deactivated when the clutch/brake detector senses the article has passed by the live roller of the second live roller conveyor that has been stopped from rotating thereby allowing the connector to move upward to release the pressure applied by the brake pad to the live roller that was stopped from rotating, while the connector at the same time urges at least one snub roller from the second plurality of snub rollers into contact with the second drive belt such that the second drive belt rotates the at least one live roller of the second live roller conveyor.

24. The non-contact article rotating apparatus of claim 23 wherein the amount of time the article takes to rotate about its generally vertical axis is based upon the conveyor speed of the first and second live roller conveyors and at least one of the size of the article, the weight of the article, the shape of the article, and a selected method of packaging the article.

25. The non-contact article rotating apparatus of claim 24 wherein all applicable clutch/brake assemblies will be actuated at the same time when the article has traveled sufficiently far on the non-contact article rotating apparatus so as to be located entirely upon live rollers of the second live roller conveyor that are equipped with clutch/brake assemblies.

26. The non-contact article rotating apparatus of claim 25 wherein all the clutch/brake assemblies that are still engaged will disengage at the same time to restore drive to all live rollers of the second live roller conveyor under the article to halt rotation of the article when the article has turned through a desired amount of rotation about its generally vertical axis.

27. The non-contact article rotating apparatus of claim 26 further comprising means for automatically correcting the amount the article is rotated on the non-contact article rotating apparatus and then adjusting the amount of rotation of the article such that articles that exit the non-contact article rotating apparatus are in a specific orientation.

28. The non-contact article rotating apparatus of claim 27 further comprising means for manually adjusting the amount of rotation the non-contact article rotating apparatus rotates the article about the article's generally vertical axis.

* * * * *